US007124362B2

(12) United States Patent
Tischer

(10) Patent No.: US 7,124,362 B2
(45) Date of Patent: Oct. 17, 2006

(54) METHOD AND SYSTEM FOR PRODUCING AN ORDERED COMPILATION OF INFORMATION WITH MORE THAN ONE AUTHOR CONTRIBUTING INFORMATION CONTEMPORANEOUSLY

(76) Inventor: Robert Tischer, 6905 Valleybrook Dr., Falls Church, VA (US) 22042-4024

( * ) Notice: Subject to any disclaimer, the term of this patent is extended or adjusted under 35 U.S.C. 154(b) by 632 days.

(21) Appl. No.: 09/944,131

(22) Filed: Aug. 31, 2001

(65) Prior Publication Data

US 2003/0121008 A1    Jun. 26, 2003

(51) Int. Cl.
*G06N 3/00* (2006.01)
(52) U.S. Cl. ...................................... 715/530; 715/513
(58) Field of Classification Search ............... 370/264, 370/445; 707/102, 103 F; 714/6; 379/88.15; 709/203; 715/513, 782, 500.1, 517, 523, 715/530
See application file for complete search history.

(56) References Cited

U.S. PATENT DOCUMENTS

| | | | | |
|---|---|---|---|---|
| 4,853,843 | A | | 8/1989 | Ecklund et al. ............. 364/200 |
| 5,297,279 | A | * | 3/1994 | Bannon et al. ......... 707/103 R |
| 5,307,456 | A | * | 4/1994 | MacKay .................... 715/782 |
| 5,337,407 | A | | 8/1994 | Bates et al. ................. 395/153 |
| 5,339,388 | A | | 8/1994 | Bates et al. ................. 395/153 |
| 5,515,491 | A | | 5/1996 | Bates et al. ................. 395/155 |
| 5,764,731 | A | * | 6/1998 | Yablon .................... 379/88.15 |
| 5,805,597 | A | * | 9/1998 | Edem ....................... 370/445 |
| 5,918,010 | A | * | 6/1999 | Appleman et al. .......... 709/203 |
| 5,966,512 | A | | 10/1999 | Bates et al. ............ 395/200.35 |
| 6,047,288 | A | | 4/2000 | Kurosawa et al. ............. 707/9 |
| 6,061,697 | A | * | 5/2000 | Nakao ....................... 715/513 |
| 6,088,702 | A | | 7/2000 | Plantz et al. ........... 707/103 R |
| 6,519,603 | B1 | * | 2/2003 | Bays et al. .................. 707/102 |
| 6,563,800 | B1 | * | 5/2003 | Salo et al. ................... 370/264 |
| 6,802,022 | B1 | * | 10/2004 | Olson ............................ 714/6 |
| 2002/0107994 | A1 | * | 8/2002 | Rickards et al. ............ 709/313 |
| 2002/0152244 | A1 | * | 10/2002 | Dean et al. ................. 707/530 |

FOREIGN PATENT DOCUMENTS

WO    WO 00/62220    10/2000

OTHER PUBLICATIONS

D. Decouchant, V. Quint and M.R. Salcedo. "Structured cooperative editing and group awareness", In Proceedings of the HCI International'95, 6th International Conference on Human-Computer Interaction (Jul. 1995).

(Continued)

*Primary Examiner*—Stephen Hong
*Assistant Examiner*—Kyle Stork
(74) *Attorney, Agent, or Firm*—Sidley Austin LLP

(57) ABSTRACT

A system and method for producing a distributed document having an ordered compilation of information is provided. The system comprises multiple fragment editor executables that function cooperatively as one implemented document type declaration (DTD). Each of the multiple fragment editor executables is a specific node implementation of the DTD. The multiple fragment editor executables are distributed among multiple sites of the computer network and operate in a peer-to-peer environment without need for a central server. The system allows multiple authors to edit the distributed document contemporaneously while allowing each of the multiple authors to view edits made by others of the multiple authors. In one embodiment of the system, each author of the multiple authors is assigned an entity type having associated therewith corresponding executables that define the role an author can play in creating distributed document.

20 Claims, 8 Drawing Sheets

OTHER PUBLICATIONS

D. Decouchant, V. Quint and M. Riveill, I. Vatton. "Griffon: A Cooperative, Structured, Distributed Document Editor", Bull-IMAG Technical Report, 93-01, May 1993.

D. Decouchant, V. Quint and M. Romero Salcedo. "Structured and Distributed Cooperative Editing in a Large Scale Network", chapter in "Groupware and Authoring", edited by: Roy Rada, Academic Press, London, May 1996.

F. Cosquer and P. Verissimo. "Survey of Selected Groupware Applications and Supporting Platforms", Technical report, 1994. Broadcast Technical Report.

T. Reps et al. "Incremental Context-Dependent Analysis for Language-Based Editors" ACM Transactions on Programming Languages and Systems, Jul. 1983, vol. 5, No. 3, pp. 449-477.

"Astoria Specialized Authoring Support System" Chrystal Software Product Brief, Copyright 1998.

"XML and Content Management: Transforming Business in the Digital Economy" Documentum Products Brief, Copyright 2000.

J. Bates. "The state of the art in distributed and dependable computing." Technical Report ESPRIT Cabernet Sponsored Report, University of Cambridge, UK, Oct. 1998.

Lin, C., et al., "CCDES - a collaborative compound document editing system," Computer Communications, vol. 19, Issues 6-7, pp. 590-6 (Jun. 1996).

Peters, R., et al., "CrystalWeb - A distributed authoring environment for the World-Wide Web," Computer Networks and ISDN Systems, vol. 27, No. 6, pp. 861-70 (Apr. 1995).

Zhang, Z. et al., DAPHNE -"A Tool for Distributed Authoring and Publishing," Proceedings of the Asis Annual Meeting, Oct. 31, 1999, pp. 1-15.

* cited by examiner

METHOD AND SYSTEM FOR PRODUCING AN ORDERED COMPILATION OF INFORMATION WITH MORE THAN ONE AUTHOR CONTRIBUTING INFORMATION CONTEMPORANEOUSLY

1 BACKGROUND OF THE INVENTION

With the advent of the personal computer, the ability of individuals to create documents has become a less burdensome task. There are a number of character editor applications that exist on the market that enable individuals to create documents, each of these products varying in their abilities. These products primarily offer contextually based solutions. Where these products suffer or lack a solution is the ability to generate a document where multiple authors are needed or wanted to compile the document. More specifically, these products do not allow multiple authors to contribute to compiling a document contemporaneously.

In many instances, the ability to construct an electronic document can be a time consuming task whether the process is accomplished by a single author or by multiple authors. The latter proposition is exacerbated by the limits of current technology. Many of the applications that exist generate an electronic data file that forms the contextual basis for the author's content. This file usually is resident on either a personal computer hard-drive or on a server, which in this instance is made available to a variety of individuals. For example, the typical business computer environment involves a communication network, which includes computer workstations and servers that act to integrate the whole system. When a document is first assembled, it is stored on the servers where any user having access privileges can open the document and proceed with the editing process.

Efforts by two or more users to work contemporaneously are met with frustration when attempted on known systems. With the current technology, one of the difficulties is that when a first user is actively working on a file, the second user has difficulty working on the same file at the same time. The second author trying to add his section to the document at the same time as another author will encounter a number of different scenarios. The first scenario is that they will be denied access to the file because another user has opened the file and the system will only allow one user at a time to have access. Another negative attribute of this particular system is that as long as the first author has the file open, whether they are working on it or not, nobody else can have access to the file.

Another scenario is that the second author is apprised by the system that another user has the file open. This results in denial to the file or the system will prompt the second author with a question of whether they want a "ghost" copy of the file or not. If the second author decides to accept a "ghost" copy and proceeds to make changes, the application will not allow the "ghost" copy to be saved in lieu of the original file. Other techniques for single document creation are more primitive in nature. A group of authors can decide on creating their own section in a separate file, which eventually would be merged into a single document. With current technology, the creation process takes longer and is inherently more complicated taking into account formatting problems that usually plague the merging of various components even of existing formats but more so with differing formats.

1.1 Related Art

1.1.1 Patents

1.1.1.1 U.S. Pat. No. 5,515,491

U.S. Pat. No. 5,515,491 discloses a collaborative data processing system. The collaborative data processing system disclosed in U.S. Pat. No. 5,515,491 operates in a client server environment and attempts to achieve its goal by allowing multiple users to share a common object. A particular weakness of the system disclosed in U.S. Pat. No. 5,515,491 is that the system lacks a computer tractable emulation of language context and therefore cannot distinguish between language context and content. As such, the disclosed system is reduced to dealing with characters and cursor movements in which the smallest atomic element of change is the character. For example, when the cursor of one user of the disclosed system lands at the beginning of a word, the whole word becomes a floating lock area. Since a word is an arbitrary natural language construct and does not contribute directly to document structure, the implementation loses sight of the goal of collaborative authoring, which is to simulate the single author environment.

1.1.1.2 U.S. Pat. No. 6,047,288

U.S. Pat. No. 6,047,288 discloses a collaborative data processing system. The collaborative data processing system disclosed in U.S. Pat. No. 6,047,288 operates in a client server environment and attempts to achieve its goal by allowing multiple users to share a common object. The system disclosed in U.S. Pat. No. 6,047,288 does have a sense of controlling environmental attributes that allows users to check in and check out portions of a shared object. However, the structure of the controlling parameters is a constant across documents and consequently does not express the linguistic context of the document. For example, the system disclosed in U.S. Pat. No. 6,047,288 suggests a 'session' root node with sub-nodes like 'notifyOnStart', 'broadcast', 'title' and so on. Given, for example, a second document, the root node and sub-node identifiers would be the same ('session', 'notifyOnStart', . . . ) except their values would be different. The value of 'session' might, for example, be 3 instead of 2. In no way can these sub-nodes be construed as being a grammar in the sense that grammar is being used in the present invention.

Without a coherent linguistic grammar imposed as the context across the set of contributing authors, the collaborative nature of the system disclosed in U.S. Pat. No. 6,047,288 is reduced to the content arbitrariness of a document-oriented configuration management system whose pieces are merely checked out and in again. Object part collaboration is not synonymous with a multiply authored virtual document.

1.1.2 Collaborative Authoring Applications

1.1.2.1 Documentum

Documentum is a content management system. The guiding design goal of content management systems is the any-to-any model plus workflow. This indeed is a kind of document collaboration, but collaboration goes no further than the file. Documentum has numerous search facilities for handling content in files of any format, but suffers from the client server model and file based system's weaknesses.

1.1.2.2 Lotus Notes

Lotus Notes synchronizes client files on a periodic basis through an agreed upon server. Lotus Notes is client server and file based and consequently has no concept of distributed linguistic context like the present invention does.

Although Lotus Notes collaborates, it collaborates on different entities than the present invention's linguistic representative, the node.

1.1.2.3 Structured Editors

1.1.2.3.1 Synthesizer Generator

The Synthesizer Generator is a structured editor tool first released in 1981. Synthesizer Generator deals with computer languages and not with linguistically semantic context free grammars (see 4.1 "semantic context free grammar"). The Synthesizer Generator has no collaborative networking capability.

1.1.2.3.2 Griffon and Alliance

Griffon (Decouchant et al. 1993) and Alliance (Decouchant et al., 1995 and Decouchant et al. 1996) each provide a distributed document environment by implementing edit controls in the form of roles on various parts of a document through the use of SGML. Document fragments are acquired, and there is one master fragment per system. When a master fragment is checked out, changed and checked back in again, fragment slaves are notified and updated.

However, each of these systems is limited in that in each the set of fragments is static throughout the authoring cycle, which is contrary to how documents get written in practice. SGML's elements are not strictly tied to either Griffon's or Alliance's notion of fragments. Consequently, Griffon and Alliance are inefficient in their ability to maintain overall document consistency. Furthermore, neither Griffon nor Alliance supports document structure change after start (except perhaps by exporting and restarting) because these programs rely on structures that can only be built at the start. Neither Griffon nor Alliance has true peer-to-peer facilities for content changes or for role and privilege storage and application. Griffon and Alliance are generalized structured editors with persistence mechanisms, which always forces centralization, at least in part, of the distributed document. Roles and privileges are not tied to the document structure.

As can be seen, a multiple author document is difficult to assemble according to known systems and methods. Current technology does not allow for an efficient manner and, in some aspects, creates further distress with its limitation and capabilities. Thus, there exists a need for an application that allows more than one author to contribute to a document contemporaneously while allowing the various authors, as well as observers to the process, to view the changes or updates as completed.

2 SUMMARY OF THE INVENTION

In accordance with these and other needs, there is provided in accordance with the present invention a method and system for producing a distributed document having an ordered compilation of information. The system comprises multiple fragment editor executables that function cooperatively as one implemented document type declaration (DTD). Each of the multiple fragment editor executables is a specific node implementation of the DTD. The multiple fragment editor executables are distributed among multiple sites of the computer network and operate in a peer-to-peer environment without need for a central server. The system allows multiple authors to edit the distributed document contemporaneously while allowing each of the multiple authors to view edits made by others of the multiple authors.

In one embodiment of the system, replicates of the complete document reside at the multiple sites of the computer network.

In one embodiment of the system, an edit made by any one of the multiple authors is propagated among the replicates residing at the multiple sites of the computer network.

In one embodiment of the system, an edit made by any one of the multiple authors is immediately propagated among the replicates residing at the multiple sites of the computer network.

In one embodiment, an edit made by any one of the multiple authors is delayed before being propagated among the replicates residing at the multiple sites of the computer network.

In one embodiment, an edit made by any one of the multiple authors is relayed to intervening personnel, and thus is delayed, before being propagated among the replicates residing at the multiple sites of the computer network.

In one embodiment, an edit made by any one of the multiple authors is propagated as an atomic transaction among the replicates residing at the multiple sites of the computer network.

In one embodiment, the replicates reside in computer memory at the multiple sites of the computer network.

In one embodiment, the replicates are persisted by writing to computer hard disks at the multiple sites of the computer network.

In one embodiment, each author of the multiple authors is assigned an entity type having associated therewith corresponding executables that define the role an author can play in creating distributed document.

In one embodiment, the roles that an author may play in creating the distributed document include: root context author, context author, and content author.

In one embodiment, a subscriber can view edits made by one or more of the multiple authors.

The present invention operates in a peer-to-peer environment. Furthermore, the present invention generates grammar-based executables for any DTD (see 4.2 "document type declaration"), which is the basis for cooperative authoring. Moreover, the present invention utilizes a computer tractable emulation of language context to make explicit a common document structure, and therefore can distinguish between language context and content. In addition, since the present invention's smallest element of change is an indivisible semantic context free grammar entity, the present invention knows that multiple changes in a document grammar element are irrelevant before they are committed.

The present invention ties all activity to the grammar structure, which itself is allowed to evolve throughout the life cycle of the document. Of course, content created using the present invention changes with respect to the current grammar's context nodes. Structural cues as implemented by the present invention don't have to be symbolic and may be clear text and are therefore indistinguishable from content text (this is a good thing). Roles and privileges as implemented by the present invention are tied to the grammar and occur as further descendent node creation (nodes may be deleted or modified too). This makes every part of a document created using the present invention, by definition, consistent with its inherent grammar structure.

The present invention has no need for a centralized server nor does it have need for hard disk persistance since populating a document occurs from node relatives instead of from centralized storage. The present invention's default mode is total document replication at each site. For the present invention, only visual cues differentiate structural portions of the document, which lends itself to natural writing behavior. A distributed document created using the present invention is really a full set of grammar node implementations each implemented for the express purpose of editing that particular piece of the document as opposed to being many copies of generalized structural editors.

2.1 Networking

An advantage of the invention is the ability to forward changes accomplished by an author as they occur. Changes are pushed onto the network to all the other document participants when an author signals the change is complete. Content change completion occurs when the author implicitly uses one of the user interface stylization cues or actions defined when the user interface was defined (see 5.4.2.2 Design User Interface).

In one embodiment, context and content changes are always pushed immediately to all other document participants making the bandwidth used directly proportional to the amount of change taking place in the distributed document at that moment. In another embodiment, context and content changes are relayed through intervening personnel, also called workflow, before reaching its destination.

Propagated context and content changes should not disrupt the recipients when received and are concurrently added to the recipient's executing processes. The most severe recipient interruption is replacing the recipient's executable causing a re-population action. The invention prescribes that, given implementation alternatives, the least disruptive alternative to users be chosen in order to preserve single document editing appearance.

Since change control is hierarchically distributed and content change authority is mutually exclusive and exhaustive, race or deadlock conditions cannot occur across the document instance's network.

2.2 Document Replication

The invention provides an equivalent replica of the document at each author node site and at each subscriber site. Each node contains a similarly constructed document and therefore each node maintains the full current version of the document by default. Since by design document changes by authors cannot cause concurrency issues, change transactions do not need to be causally sequential, and therefore may arrive and be applied in any order at their destinations.

In order to maintain the replication invariant, each transaction must, however, be atomic, thus insuring that the document instances in quiescent state at each site are exact replicas. For a change message to be atomic, the recipient's executable must eventually acknowledge that it has received and applied the change request. Although there is no time limit as to when a change request may be applied, the request is not merely a connectionless broadcast message that needs no acknowledgement. A document is only quiescent if the root context author stops all authors from making changes and all change messages have been successfully delivered.

2.3 Populating

In the site's computer executable is code for populating its own instance upon startup either at creation time or after shutdown. Since all sites by default contain exact replicas, a donor site is chosen at random to populate the newly started instance. The invention allows for any population algorithm to be used as long as the algorithm isn't 100% dependent on disk storage, which by definition is always inconsistent with the distributed virtual document.

2.4 Generalized Document

The present invention's use of the term document is broader than mere sequentially organized text.

Documents are written so a human mind can start perceiving and understanding at the beginning of the document and continue this process until the end of the document is reached. This is an inherently semantically temporal process.

The presentation, however, of the instance of any author node or subscriber may take any form as long as it maintains this semantically temporal invariant. For example, instead of paragraphs, sections and words as depicted in the FIG. 7 illustration, animation clips could have been developed, the result of which would be a motion picture presentation format. The underlying semantic grammar (see 4.1 "semantic context free grammar") would remain the same.

2.5 Natural Language Imitation

The goal of the present invention is to create a computer environment that facilitates a document being authored cooperatively and simultaneously by multiple authors without losing document integrity. This process recapitulates the formation and evolution of natural language. This formation and evolution process is one of complementary context and content creation and change. The present invention emulates this natural language creation process by organizing computer software and structuring document cooperation along these same lines. Hence, context and content creation are always separate activities.

Since natural language creation and change is the real world's multiply authored document, then the computer tractable representation of this process, which is the present invention, is therefore the multiply authored document using computer software.

2.6 Node Based, not File Based; Minimized False Invalidation

The file in a computer directory has a single name and content. If someone changes any character in that file, it makes any copy of the file invalid. Short of maintaining pointers to individual pieces or characters in the file, there is no way of telling which piece of the document has invalidated the entire file. Document systems and processors are all either file based or concurrency controlled in order to maintain document integrity, which imposes serious non-natural language interference in the document creation process. Making a change anywhere in a file falsely invalidates areas that have not been changed.

The present invention ties document integrity to the atomic semantic node instead of to the file. Thus, when a change is made anywhere in the content of a semantic node, only that atomic node becomes invalid with respect to replicate nodes elsewhere. The overall result is a set of mutually exclusive yet atomic semantic document work areas, whose semantic sum is an entire coherent topic. When atomic nodes for a semantic context have been predetermined as is the case in the present invention, there is no false invalidation.

2.7 Average Writing Style Based; No Tags; Not WYSIWYG

Markup languages allow implicit document structure to become computer processable. But structure and context are supposed to be invisible when producing natural language content. Thus, the tag artifact by its very presence is a hindrance. Current document applications usually show these tags as trees that may be made visible when the author needs orienting. Or sometimes, the current set of legal tags appear as drop-down lists from which the author may choose. The problem is that these computer control artifacts intrude on the authoring process.

The present invention calls for standard document artifacts to be used as style representatives of unchangeable context, as differentiators of context and content, and as indicators of movement from one semantic node to another by an author. An example of downstream requirements intruding on the authoring process is the WYSIWYG (what you see is what you get) technology. Here single-user printing process's requirements impose themselves directly on the document creation process.

2.8 Distributed Persistence

A consequence of this invention is, since replicate documents exist at each authoring or subscriber site, there is no need for the document to be written to a hard disk, that is, persisted. Document sites are populated on startup from a random set of sibling sites and the resulting mean time between failures above just a few sites becomes greater than that for hard disks. The hard disk becomes irrelevant. Of course, it is no problem to persist the document since any site has the ability to export its running application as a marked up instance.

2.9 Peer-to-Peer; Not Client Server

Replicate documents at each site means there is no central server that can create a bottleneck. Information flow is entirely dictated by semantic and cooperation needs and requirements. The present invention is truly peer-to-peer because there is no need for data concurrency impositions.

2.10 Markup for Authoring, not Data Collection and Dispersal

Markup today is used mainly for aggregating and syndication of information that has been tagged with tags that resemble natural language, like <vegetable>. The major deficiency in this approach is that it assumes the data has already been created either by a single author or by a series of single authors. In contrast, the present invention disseminates during the creation process, which is a superset of the aggregation-syndication model and covers real and complete document life cycle. The reason current markup processes cannot include the authoring process is, there is no functionality in the aggregation syndication model for the cooperation of DTDs (see 4.2 "document type declaration"), which represent the linguistic contexts of that which is being aggregated and syndicated. Therefore, instance cooperation upon which aggregation and syndication is applied, is a veritable cacophony of computer search processes. These disparate DTD instances are therefore relegated to having to be search and mined, which has little or nothing to do with the actual authoring process.

2.11 No Generalized Structured Editor; No Bottleneck Server

The present invention is not a generalized editor but rather a suite of generated complementary fragment editor executables per document. Multiple fragment editor executables are created that function cooperatively as one implemented DTD (see 4.2 "document type declaration" and 4.30 "fragment editor executable"). Each fragment editor executable is in effect a streamlined specific node implementation of the DTD. The difference in efficiency using any kind of measurement is large. Also, since the present invention operates peer-to-peer with a replicate of the complete document at each site, the resulting authoring environment for the present invention automatically attains the goal of single author look and feel, which is not possible with the client server model which only presents to the author the node or nodes checked out for the editing task at hand. The more nodes checked out in the client server approach, the longer other authors will have to wait to make their changes. Even if the current client server document technology were extended to allow read-only check out to facilitate single author look and feel, there would be no inherent way for the read-only portions to be updated. Although it is possible to use callback to update clients in the client server model, it is an extremely intensive programming approach and merely would serve to make further disjoint the activities involved in seamless collaborative authoring.

The present invention insures that there is a constantly evolving exhaustive and mutually exclusive set of authors that cooperatively own and develop the virtual document. This is only theoretically possible using traditional database privileges. Privileges, ownership and execution behaviors of nodes in the client server document model are separate activities, whereas these characteristics in the present invention are indivisible as is necessary for virtual document integrity.

The present invention's peer-to-peer model has lead to an efficient collaborative document authoring application without the need for a bottleneck server.

Further object features and advantages of the invention will become apparent from the detailed description that follows.

3 BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

4 DEFINITIONS

4.1 "Semantic Context Free Grammar"

Figure 1:
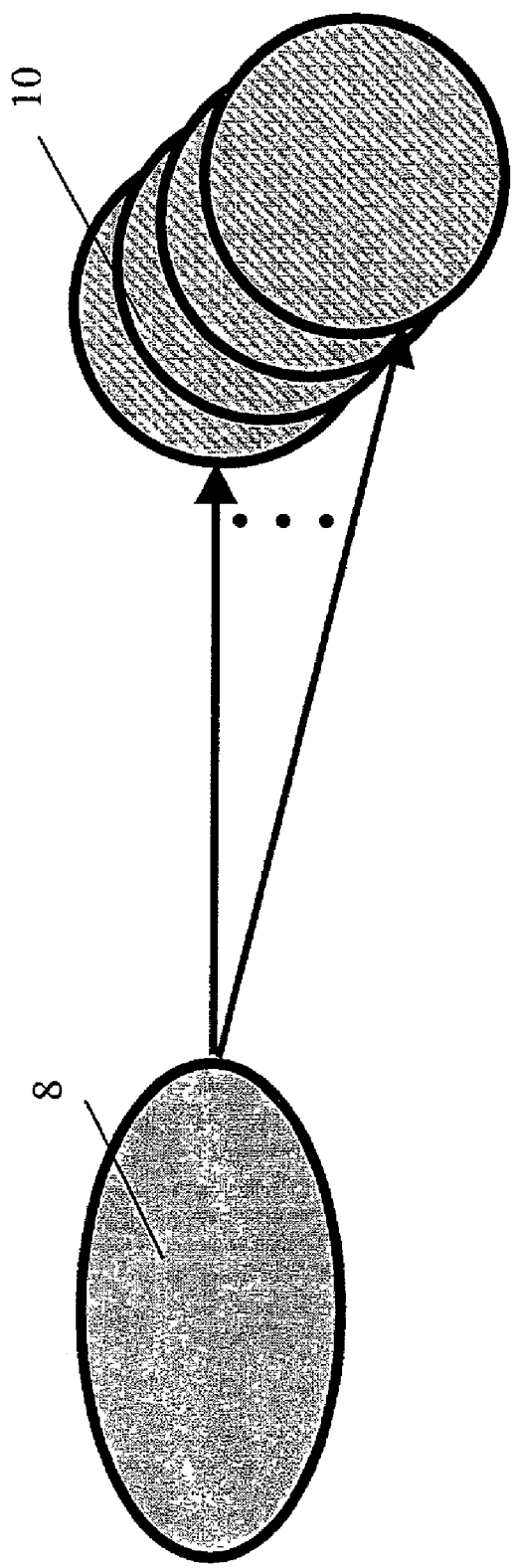
FIG. 1 is a graphical representation of the generation of root context authors.

As used herein and in the claims, the phrase "semantic context free grammar" is a term in linguistics, "semantic grammar", combined with a term in computer science, "context free grammar", or CFG. The two term's constituents are analogous. CFGs consist of non-terminals defined by productions, which are further defined by terminals. Therefore the following is a complete grammar from the computer science perspective (capital letters represent non-terminals and small letters represent terminals):

A: B c D e
B: b
D: d

Semantic grammars in linguistics are evolving natural language structures, sometimes called paradigms, held alive by practicing members of defining groups of linguistically competent humans. Examples of explicit standardized semantic grammars are the transaction sets and messages of EDI (electronic data interchange). Another example is the Merck Manual (see 5.6 "Document Evolution Illustration"). This particular semantic grammar is defined presumably by a set of authorized medical doctors, and whose structure can be implemented on a computer using standard computer science parsing techniques.

The present invention equates a semantic grammar's node with a CFG's non-terminal and implements semantic grammars on computers in a way that allows the semantic non-terminals to behave as the present invention's context authors (see 4.17 "context author") and terminals to behave as the present invention's content authors (see 4.18 "content author") in order to collaborate on creating linguistic content without undermining the creative expression process.

4.2 "Document Type Declaration"

As used herein and in the claims, the phrase "document type declaration" (DTD) refers to ISO 8879 standard's rules for producing document syntaxes. These document syntaxes have the potential of being human readable and therefore able to make natural language sense to the document creator. ISO 8879 insures that the produced document syntaxes are computer tractable thus guaranteeing a tie between natural language and its representation as context in a computer.

4.3 "Ordered Compilation of Information"

As used herein and in the claims, the phrase "ordered compilation of information" refers to written text or animations sequenced in such a way as to impart coherent knowledge to a temporally perceiving literate human attempting to understand the sequence from beginning to end.

4.4 "Context"

As used herein and in the claims, the term "context" refers to the a priori environment within which written or spoken natural language content is produced. Although there are many parts to natural language environment context, ISO 8879 highlights the semantic hierarchy is being its most relevant representative. The DTD makes natural language context explicit and therefore computer tractable. Linguistic context is always constant when content is being produced or modified. Thus, in the instance fragment:

<MerckManual> The Merck Manual first appeared in
1899 as a slender 262-page text titled Merck's
Manual of the Materia Medica.
   <HeartFailure>
   A common syndrome that may be caused by many
   different etiologies whose clinical manifestations
   reflect a fundamental abnormality - a decrease in
   the myocardial contractile state such that cardiac
   output (CO) is inadequate for the body's needs.
   </HeartFailure>
</MerckManual> the <MerckManual>, </MerckManual> </HeartFailure>, and </HeartFailure> pieces are representation of linguistic context set in some semantic hierarchy, where the second pair is semantically subordinate to the first pair.

4.5 "Content"

As used herein and in the claims, the term "content" is exemplified by the text in between the markup pairs in the "context" definition above.

4.6 "Instance Tag"

As used herein and in the claims, the phrase "instance tag" is the computer tractable expression of context and is exemplified by the <MerckManual>, </MerckManual>, </HeartFailure>, and </HeartFailure>pieces in context definition above. An "instance tag" refers exclusively to an SGML instance of a DTD (see 4.2 "document type declaration"), specifically the start and optionally end tag surrounding content.

4.7 "Transaction"

As used herein and in the claims, the term "transaction" refers to the exercise of a change request message protocol from an author to recipient. This protocol includes making the request, handling acknowledgements and eventually committing the results as irreversible.

4.8 "Atomic Transaction"

As used herein and in the claims, the phrase "atomic transaction" refers to a transaction in which, if any of the protocol parts are not carried out properly and thus leading to inconsistent document replicas at the various sites, then actions are taken to repair the offending recipient. Receiving an acknowledgement from a recipient does not necessarily mean the change has been applied, but rather that the recipient application promises to either apply the change eventually or resolve the change otherwise. This allows for any number of workflow scenarios that involve multiple hop delivery of messages.

4.9 "Subscriber Site"

As used herein and in the claims, the phrase "subscriber site" refers to the computer that is executing a particular subscriber application.

4.10 "Document Section"

As used herein and in the claims, the phrase "document section" refers to a particular node's visual representation of stylized context and content.

4.11 "Recordation"

As used herein and in the claims, the phrase "recordation" refers to a particular editor type site's address lists of recipients to which content and administrative change requests are sent when they occur.

4.12 "Entity Type"

As used herein and in the claims, the phrase "entity type" refers to the roles individuals equipped with their corresponding executables can play in creating a multiply authored document.

4.13 "Editor Type"

As used herein and in the claims, the phrase "editor type" refers to authors whose executables allow them to at least make content changes in the document.

4.14 "Subscriber Type"

As used herein and in the claims, the phrase "subscriber type" refers to document participants whose executables allow them to at least view the document.

4.15 "Root Context Generator"

As used herein and in the claims, the phrase "root context generator" refers to software that can create and deploy initial root context authors. The root context generator is the present invention's fragment editor generator (see 4.31 "fragment editor generator executable").

4.16 "Root Context Author"

As used herein and in the claims, the phrase "root context author" refers to an editor type executable that represents the upper most node in a document's semantic hierarchy.

4.17 "Context Author"

As used herein and in the claims, the phrase "context author" refers to an editor type executable that is semantically subordinate to the root context author and optionally subordinate to other context authors, and who has the capability to change document context as well as content.

4.18 "Content Author"

As used herein and in the claims, the phrase "content author" refers to an editor type executable that is semantically subordinate to the root context author and optionally other context authors, who has no subordinate child nodes, and who has the capability to change document content.

4.19 "Subscriber"

As used herein and in the claims, the phrase "subscriber" refers to a non-editor type executable that has no semantic node associated with it. Subscriber types can be created by editor types as well as by other subscribers if permitted.

4.20 "Node"

As used herein and in the claims, the term "node" refers to an SGML element that is a single natural language identifier representing a linguistic semantic category, and also refers to an executable that was created specifically to perform operations that are specific to and consistent with the semantic category it represents. A node is therefore a duality of representation and operation (see 2.6 "Node Based, not File Based; Minimized False Invalidation")

4.21 "Target Node"

As used herein and in the claims, the phrase "target node" refers to a node executable created by an existing context author or root context author.

4.22 "Sub-Node"

As used herein and in the claims, the phrase "sub-node" refers to a node whose semantic content is subordinate to the current node.

4.23 "Descendent Node"

As used herein and in the claims, the phrase "descendent node" refers to and is interchangeable with a sub-node.

4.24 "Replicate View Node"

As used herein and in the claims, the phrase "replicate view node" refers to a node that is exactly the same as a semantic node with the same identifier at another site in the same document. Each editor type site's executable is an implementation of the node it owns, but which also contains replicates of the other nodes it doesn't own or can change, which therefore are for viewing.

4.25 "Context Author Node"

As used herein and in the claims, the phrase "context author node" refers to the deployed executable owned and used by its context author.

4.26 "Content Author Node"

As used herein and in the claims, the phrase "content author node" refers to the deployed executable owned and used by its content author.

4.27 "Conventional Writing Behaviors"

As used herein and in the claims, the phrase "conventional writing behaviors" includes the abilities to indent, outline, summarize, illustrate, partition text into coherent sequential paragraphs, sections and chapters, as well as the abilities to choose and utilize common structural visual cues that signal document structure, such cues including but not limited to visual textual cues such as indenting, numbering, shading, coloring, bold, italics and underline.

4.28 "Structured Editor"

As used herein and in the claims, the phrase "structured editor" refers to a word processor that uses a DTD instead of the individual character to guide the user in the editing process.

4.29 "Generalized Structured Editor"

As used herein and in the claims, the phrase "generalized structured editor" refers to a structured editor that has the ability to accept, compile and utilize a large variety of structures, the most popular of which is the ability to use any kind of DTD (see 4.2 "document type declaration"). The present invention does not employ a commercial generalized structured editor, but rather is a suite of cooperating complementary fragment editors (see 4.30 "fragment editor executable") per document each fragment of which is generated as needed.

4.30 "Fragment Editor Executable"

As used herein and in the claims, the phrase "fragment editor executable" refers to the executable for operating on a particular DTD node.

4.31 "Fragment Editor Generator Executable"

As used herein and in the claims, the phrase "fragment editor generator" refers to executable code that can create fragment editor executables (see 4.30 "fragment editor executable") for operating on particular DTD nodes.

4.32 "Repository"

Repositories are any kind of database that has a markup language superstructure. The reason the industry chose the word repository instead of just database is, the purpose of databases is to guarantee the integrity of the internal data. Although repositories are able to signify that markup components and elements have been checked out of the database, it cannot guarantee their consistency with respect to the rest of the internal database information. Updates in repositories are carried out at the client, whereas, updates in databases are carried out on the server. The name repository signifies this difference, which makes its utility more like a software configuration management system.

5 DETAILED DESCRIPTION OF THE PREFERRED EMBODIMENTS

A preferred embodiment of the present invention is a syntax-directed application comprising a root context generator and a root context author, and optionally comprising one or more selected from the group consisting of a context author, a content author and a subscriber. With all components running in tandem, the application functions as a distributed language-based word processor. The invention allows each author to work on his or her section of the document while viewing concurrently the changes of other authors working on the same virtual document.

5.1 The Role of SGML

All linguistic expression, whether expressed by speakers, readers or writers, is produced within an implicit linguistic context. With the advent of ISO 8879 Standard Generalized Markup Language (SGML) standard in 1986, linguistic expression on the computer has become a non-proprietary process. Using SGML, the implicit semantic structure of any natural language expression or compilation may be expressed through the syntax of a Document Type Declaration (DTD). The DTD transforms the linguistic context of language expression or compilation into an explicit form that is computer-tractable.

SGML is a generic set of keywords, naming syntax, occurrence and connector terms structured in such a way that the document structure designer uses them to express literally any real world set of natural language semantic notions in a notation that computers can process. The DTD is the computer-processable coherent expression of such language. SGML can produce an infinite number of DTDs.

In a preferred embodiment of the invention, multiple authors cooperatively comprise a single SGML DTD. This common DTD is not a tangible computer object or shared memory anywhere, but is rather the sum of the effect of the deployed editor type executables. The sum of the deployed nodes is equal to the implementation of a single DTD. This single DTD defines the context in which each author works. Because a single virtual DTD is cooperatively used, with the exception of styling, the context remains identical at each authoring site. Depending on their ability types, authors cooperatively expand and grow the virtual DTD until the semantic area is deemed exhausted by the authors and privilege grantors. When all context and content creation privileges have been revoked for all nodes, the virtual distributed document is deemed complete.

The present invention implements the DTD prescription for a group of document writers, enabling each of them to simultaneously produce changes in content on a mutually exclusive and exhaustive basis with respect to the DTD all the while viewing text content and context from the whole document simultaneously. The invention connects the underlying grammatical structure invisibly to the author's conventional writing behaviors by tying currently accepted text styles to the grammar at the time when the executable document is created. DTD instance tags are therefore never visible to the author or subscriber, but rather context meaning is redirected through styling cues. This process of context styling is analogous to what occurs for natural language documents.

5.2 Entity Types

A preferred embodiment of present invention comprises five entity types each with differing capabilities. The five entity types are (1) root context generator, (2) root context author, (3) context author, and (4) content author and (5) subscriber. The types are causally related. Each type has capabilities, privileges and supplementary code behaviors that are predefined at creation time, but that are modifiable at runtime. These entity types are further classed into two overall types: editor type and subscriber type. The root context author, context authors and content authors are all editor types. All editor types are assigned nodes, and all editor types are capable of editing document content. The root context author and context authors are capable of creating and modifying context by creating or changing sub-nodes as well. A subscriber type, unlike all editor types, is not assigned a particular node and is therefore a non-editor type. Subscribers are considered third parties and thus are only able to witness the evolution of the document.

For each root node topic the invention is accomplished by a collection of editors and non-editors all of whom are privy to the creation of the document.

5.3 Document Parts and Capabilities 5.3.1 The Document 5.3.1.1 Viewing

All types have the ability to view the document sections. A section is a node's visual representation of stylized context and content. It is possible with the invention for a node to grant to any and all of its descendent nodes access to none of the document or the whole document, or any portion thereof.

5.3.1.2 Context and Content Editing

All editor types have the ability to edit content of their node. Content refers to text material between SGML instance start and end tags. There is one and only one author per DTD node who may edit content. Regarding all context portions of the document, all entity types are supplied with read-only privileges. The stylized expression of context always occurs only at node creation time. Consequently, no node recipient may alter the context cues of the received node. Likewise in natural language, context exists prior to the exercise of producing language content. Only the root context author can set the initial style of the context representation portions of the document. Subordinate context authors may modify the initial style only within permitted bounds, and their modifications are limited to newly created sub-nodes.

5.4 The Node

The node and its semantic relationships to its parent and children represent language context. The DTD keeps these relationships straight all the while allowing the representation to be computer tractable.

A node is the computer address of the author and it is a semantic element identifiable in the DTD. A node comprises executable code that embodies the abilities with which it was created. Upon creation of a new node, every previous node and subscriber is apprised of the new node that has been added to the document. This apprising results in the addition of the new node's section within all document instances. The apprising operation modifies all recipient's operation so that the new node can continue the apprising process as further changes occur. Subsequent changes to the new node's content affect only the corresponding new node in a recipient's document.

5.4.1 New Node Creation 5.4.1.1 Semantic Child Nodes

The root context author and context authors have the capability of creating and assigning new semantically descendent portions of the document to new authors. Node creation is the atomic act of semantically further differentiating the creator's node, creating the executable code for the new node and forwarding the code to the target author. The new author is granted reading and writing privileges for the content of that new node. Each creation and assignment results either in the creation of a context author or the creation of a content author. At any time during runtime, context authors can create new semantically subordinate context authors and content authors. Content authors do not have this ability.

Any author node or subscriber has the innate ability to create another subscriber, although this privilege may be revoked at runtime or the ability simply may not be provided at code creation time. A subscriber does not own a particular node.

It is only possible to create a node in the document whose content is alterable by one and only one author.

5.4.1.2 Node Ownership and Administration

An author may own and operate more than one node. He may also administrate directly any sub-node or alternatively grant or revoke privileges for subordinate nodes to carry out some or all of his tasks.

Any implementation algorithm employing supplementary code may be utilized for effecting authoring control over particular occurrences of multiply occurring content groups ("content groups" is an SGML term) or elements as SGML occurrence indicators may permit, that is, *, + and ?, as long as the algorithm doesn't compromise the node owner's basic ownership rights.

5.4.2 Steps to Create a New Node

In a preferred embodiment, there are five steps involved in creating new nodes.

5.4.2.1 Select Semantic Sub-Node

Selecting a new sub-node is the same process that occurs when selecting a new node using a DTD editor.

5.4.2.2 Design User Interface

With the new node named and placed properly in the DTD tree, a user interface for the new node is created. The user interface enables the authors to orient themselves visually with respect to the context of the entire document, and it enables authors to enter content edits in the assigned content area of the document.

The user interface's visual structural cues for the new node should complement the rest of the document. Creating the user interface involves selection of visual structural cues from within the privileges and parameters inherited from ancestral nodes. This selection process results in executable code in the target source. Other ownership and network connection information is collected.

At creation time for both context and content document parts, user visual cue and action preferences for indicating beginnings and endings of document parts or indicating completion of edit changes to a document part, are extracted from the creator using standard dialog sessions. Regarding completing change of content, this signaling process is part of the user interface stylization and follows normal document writing cues that indicate the author is leaving or entering a changed area. Since change of context does not occur at run time, there are no actions but only visual cues that serve to orient the user with respect to the document structure.

New context authors have the ability to design user interfaces for any new sub-nodes they may create. New content authors do not have this ability.

5.4.2.3 Choice of Privileges and Supplementary Behaviors

Beyond the innate capabilities of the node type being created, the node creator may grant any set of privileges or endow it with any capabilities that were inherited at its creation time. This set of privileges and capabilities may be altered or revoked or modified at runtime by its ancestor nodes.

New context authors have the ability to set privileges and bequeath behaviors to new sub-nodes they may create. New content authors do not have this ability.

5.4.2.4 Node Deployment

Context author nodes are able to deploy the new executable code to the new author's computer. Furthermore, subsequently created context author nodes contain the ability to deploy executables that they may create to any new sub-nodes they may create. Content authors do not have this capability.

5.4.2.5 Updating Authors and Subscribers

The final step is updating the current authors and subscribers with the new section in the document that this node represents. Without acknowledgement that all these steps have successfully taken place, none of the new code will be activated and rollback to the previous document state must take place.

5.4.3 Included Standard Capabilities

5.4.3.1 Displaying Context and Content Change

A newly added node executable includes by default the ability to receive the content changes from any and all other nodes. This applies to all editor types and subscribers.

5.4.3.2 Propagating Content Changes

A newly created author node includes by default the ability to push content changes to the list of all node authors and subscribers. This applies to editor types.

5.4.3.3 Accept New Addresses

A newly created editor node includes by default the ability to accept and add to its distribution list, subsequently added author addresses to which the newly created editor node will send changes. This applies to editor types.

5.5 Incremental Document Growth

The present invention embodies two separate but simultaneous growth and change paths, which parallels the way natural language behaves. One path is simultaneous context change and the other is simultaneous content change. Change in general encompasses creation, modification, deletion, granting and revoking document parts and characteristics. Context authors simultaneously create new and alter sub-nodes, and context and content authors create and alter content.

5.5.1 Root Context Generator

In a preferred embodiment, the first step of the invention is to create executable computer code for the root context author. A topic is selected for the root node, context stylization is set to default parameters, and an executable is generated and deployed to the target root context author.

5.5.2 Root Context Author

In a preferred embodiment, there is only one root context author per document, who oversees and controls the creation of the initial document. DTD change control is eventually hierarchically distributed to all context authors, or it may be kept centrally at the root context author, or control may be hierarchically distributed to any degree in between. The root context author may create any number of semantically and privilege-wise subordinate node executables.

The root context author modifies the default context stylization and even the root node name if desired. Any privileges and behaviors that are deemed necessary for the authors to successfully write the distributed document are added to the executable. After being configured for a particular sub-node during the sub-node creation process, it is this set of privileges and behaviors that sub-node executables are endowed with when they get created.

5.5.3 Context Author

In a preferred embodiment, the context author may only further configure context stylization, privileges and software behaviors for the sub-nodes that it creates. Context authors may create any number of semantically and privilege-wise subordinate node executables.

Context authors may create or edit content any number of times.

5.5.4 Content Authors

Content authors may create or edit content any number of times.

5.5.5 Subscribers

Subscribers view the document as it evolves.

5.6 Document Evolution Illustration

FIG. 1 is a graphical representation of the generation of a root context author at time zero. In this instance, the root context generator (8) generates a root context author to begin the document generation process. (10) points to one of four root context author executables it has generated.

5.6.1 Node Executable Interaction

Figure 2:
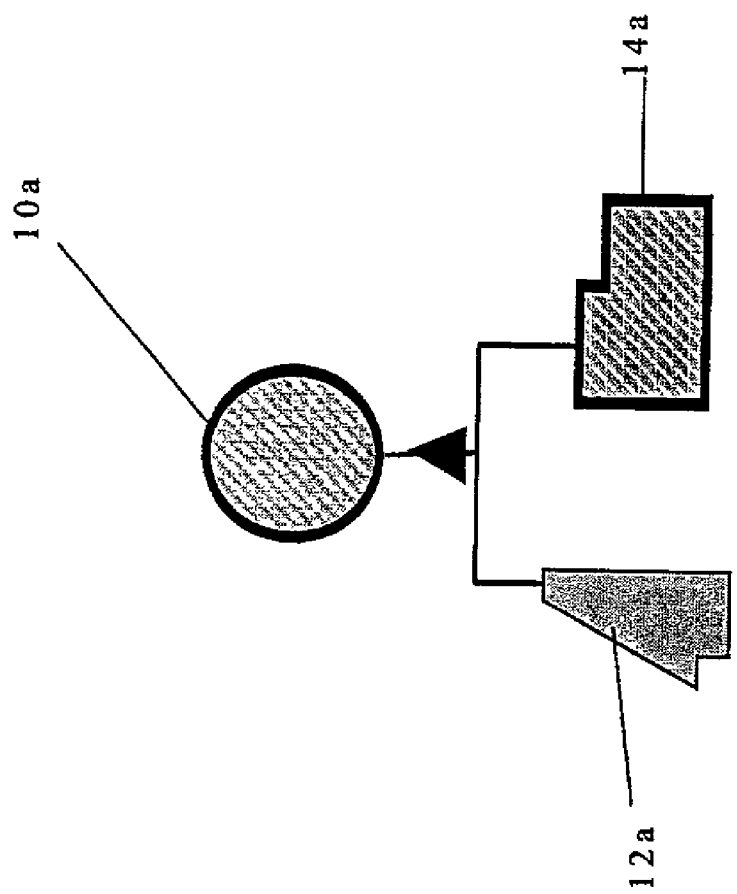
FIG. 2 is a hierarchy view of the present invention in regards to context author creating two sub-nodes.

FIG. 2 is a hierarchy view of the present invention illustrating time one in this illustration document's life. For generality's sake shapes have been substituted for named nodes. A thick node border denotes a context author node and a thin border a content author node. Since subscribers do not own nodes, they have not been included in order to reduce complexity.

In FIG. 2 context node 10a has created content author sub-node 12a and a context author sub-node 14a. Between time zero and time one, two context changes have occurred.

Figure 3:
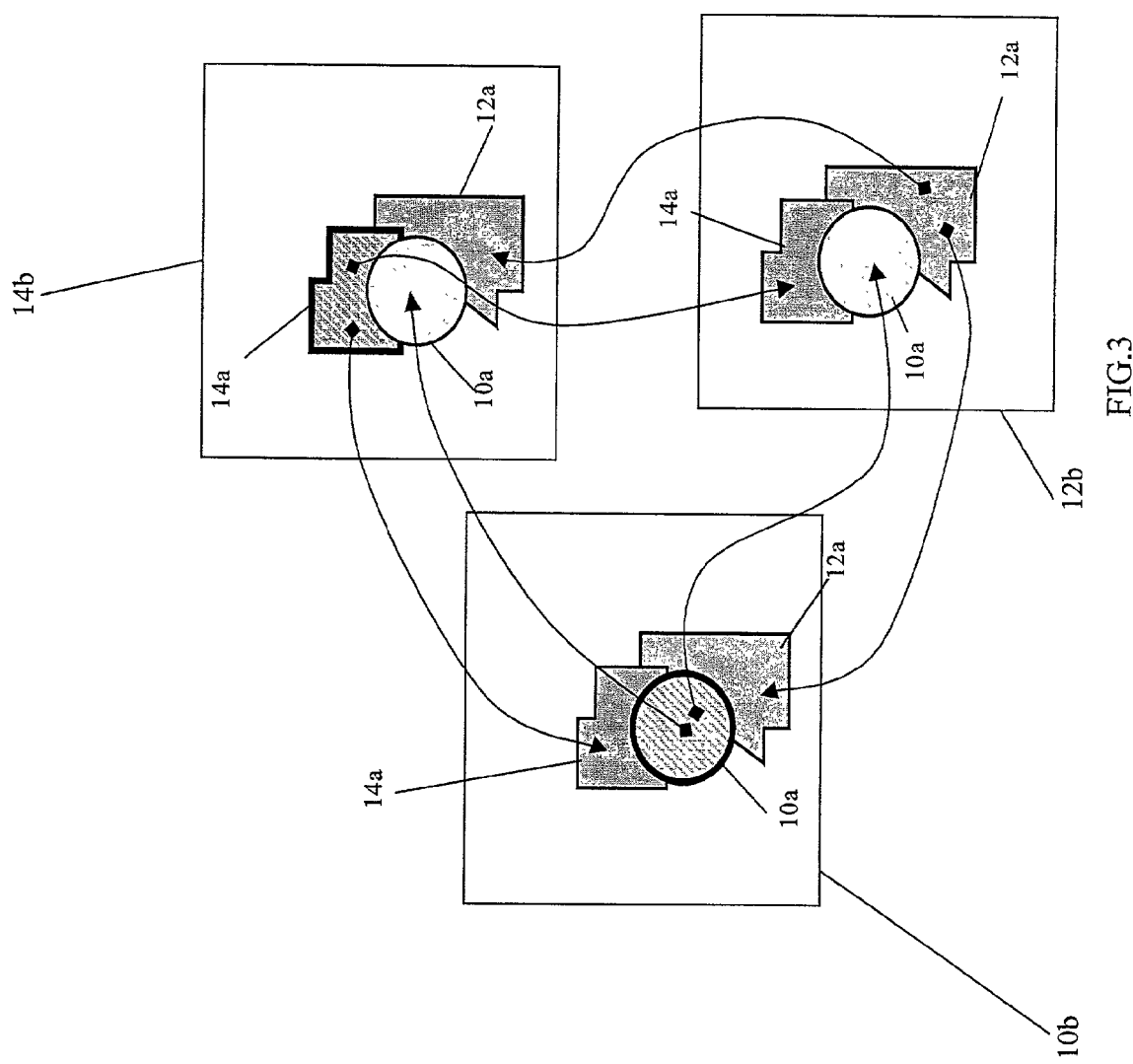
FIG. 3 is diagrammatic view of the FIG. 2 in running state.

FIG. 3 illustrates FIG. 2 in running state with the created nodes deployed as executables 10b, 12b and 14b. Each author executable contains all three nodes. Three content changes have occurred since time one resulting in 6 content messages to the other executables at their sites.

Figure 4:
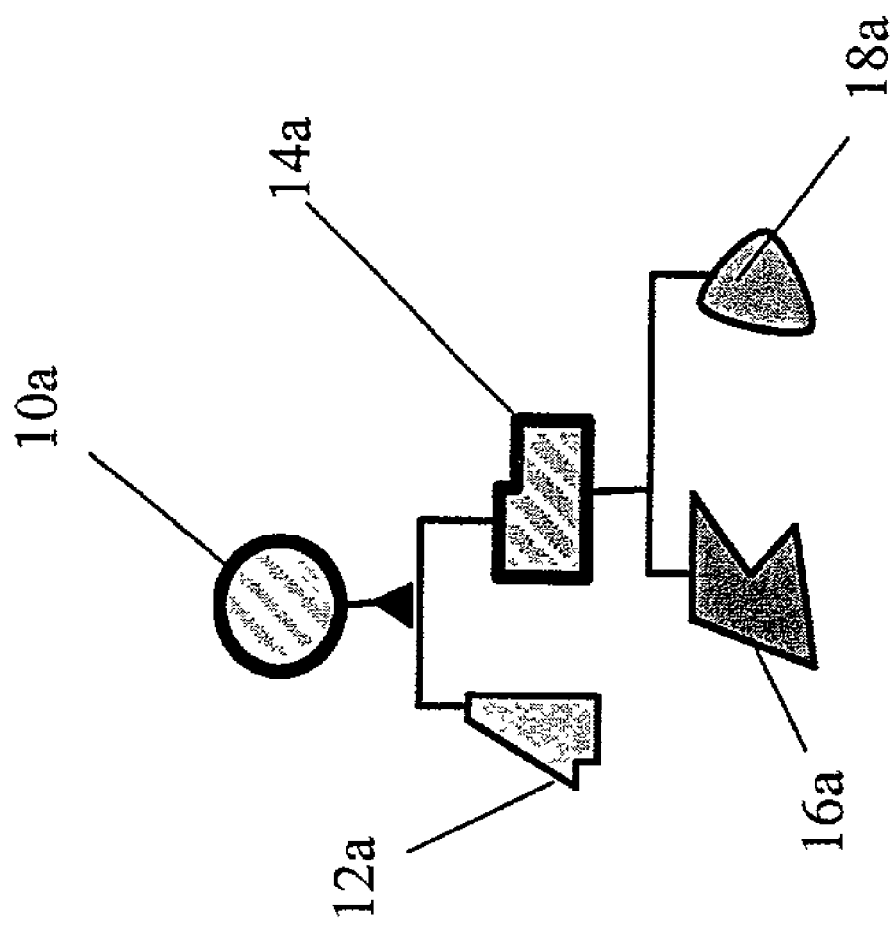
FIG. 4 is a hierarchy view of the present invention in regards to a subordinate context author further creating two sub-nodes.

FIG. 4 is a hierarchy view of the illustration document at time two. Between time one and time two, context author 14b has further differentiated its node 14a into two content author sub-nodes 16a and 18a.

Figure 5:
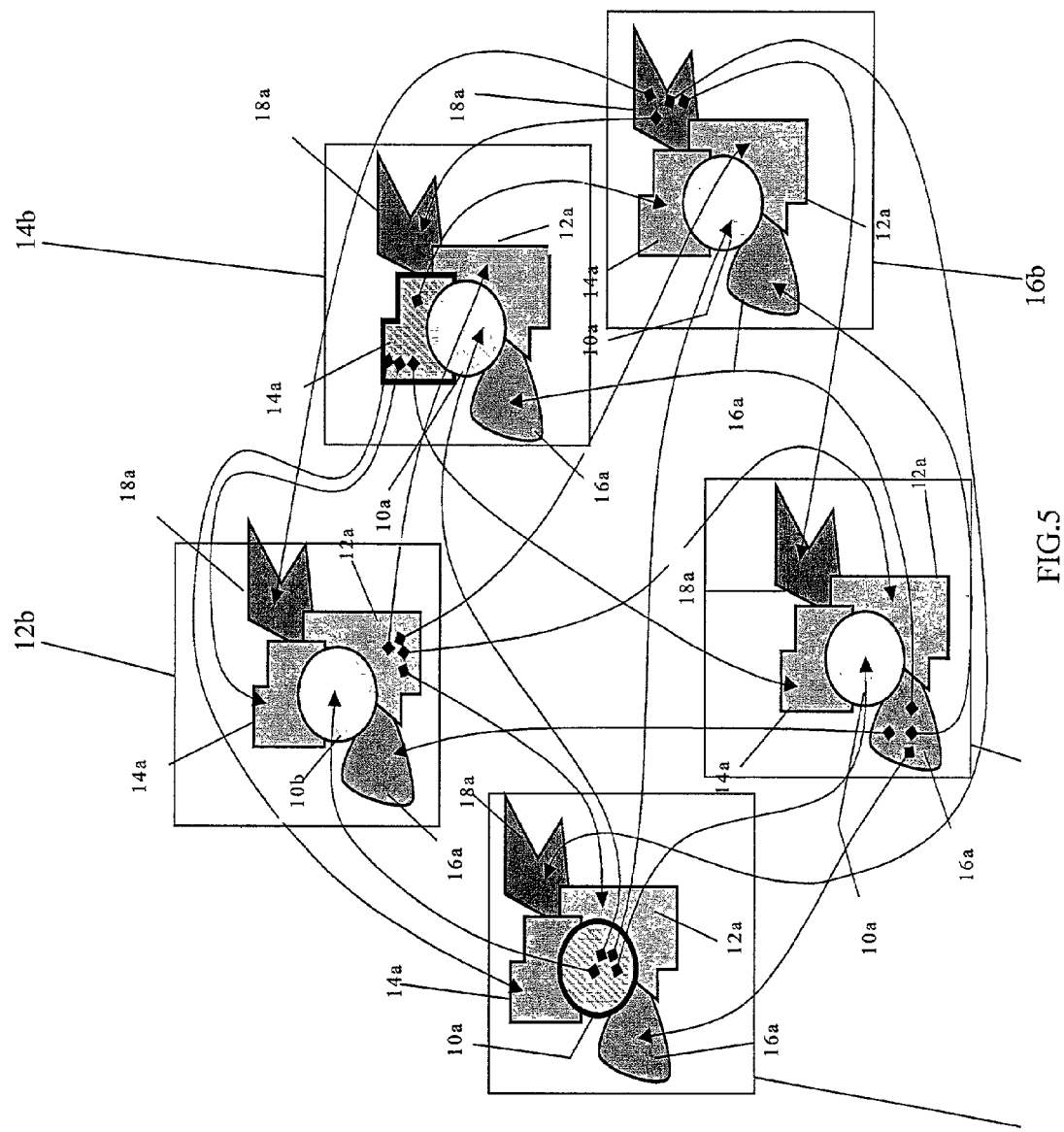
FIG. 5 is diagrammatic view of the FIG. 4 in running state.

FIG. 5 illustrates FIG. 4 in running state with the created nodes deployed as executables 10b, 12b, 14b, 16b and 18b. Each author executable now contains all five nodes. Each author has made one content change since time two resulting in 20 content messages to the other executables at their sites.

5.6.2 Context Node Executable Generation

Figure 6:
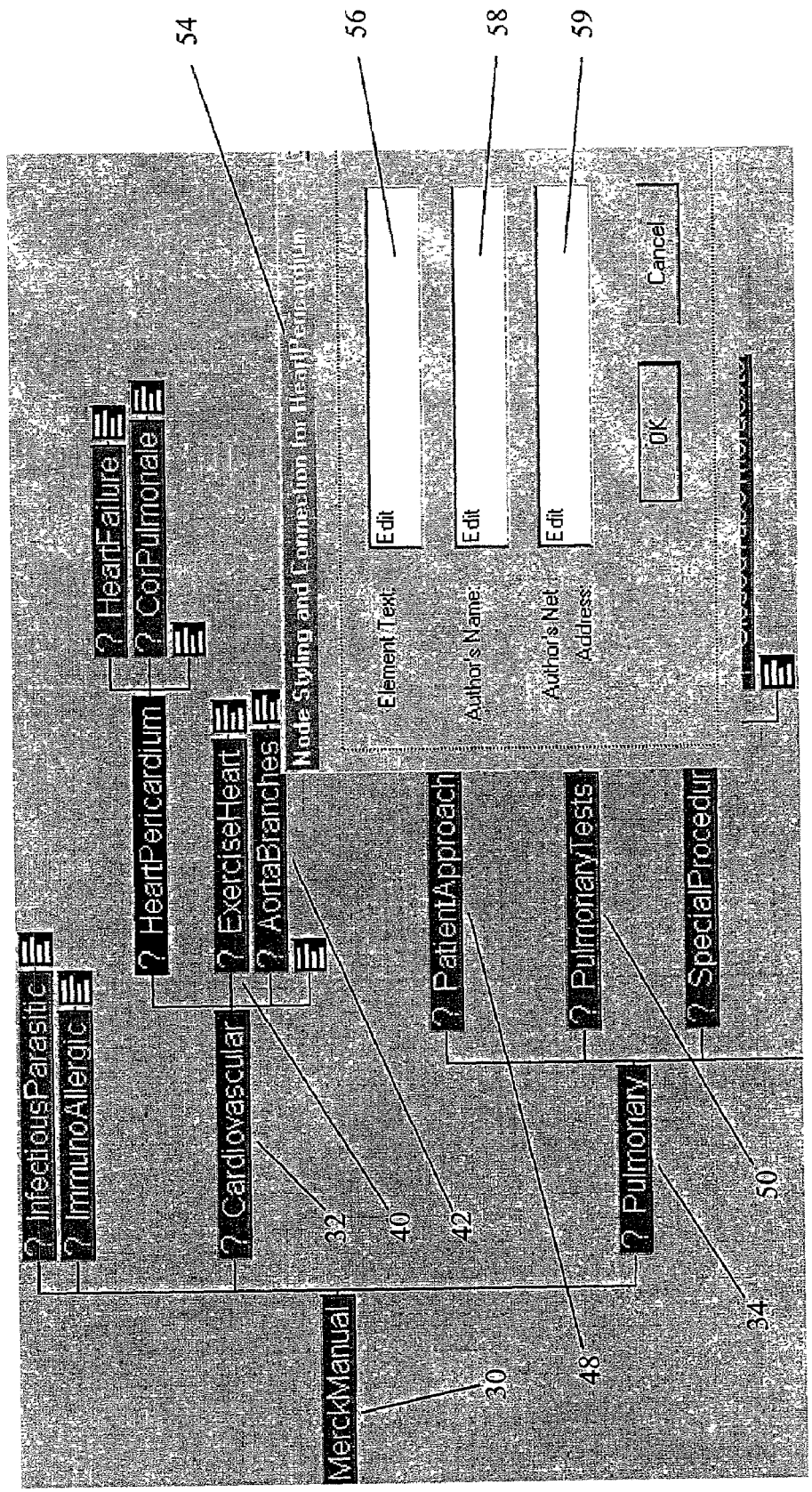
FIG. 6 is a view of a representative framework dialog for assigning nodes of the invention.

FIG. 6 is a diagrammatic view of the present invention for illustration purposes. The root context author MerckManual (30) has already created sub-nodes Cardiovascular (32) and Pulmonary (34). PatientApproach (48) and PulmonaryTests (50) nodes were created either by MerckManual (30) or Pulmonary (34). Cardiovascular (32) or MerckManual (30) has already created ExerciseHeart (40) and AortaBranches (42) and is in the process of entering configuration information into dialog box (54). After completion, HeartPericardium's (38) executable is created.

For illustration purposes, dialog box (54) shows three pieces of information being requested. (56) asks for the text literal that is to replace the node start tag. (58) asks for the author's name and their net address (59) (i.e. IP address, network address).

Figure 7:
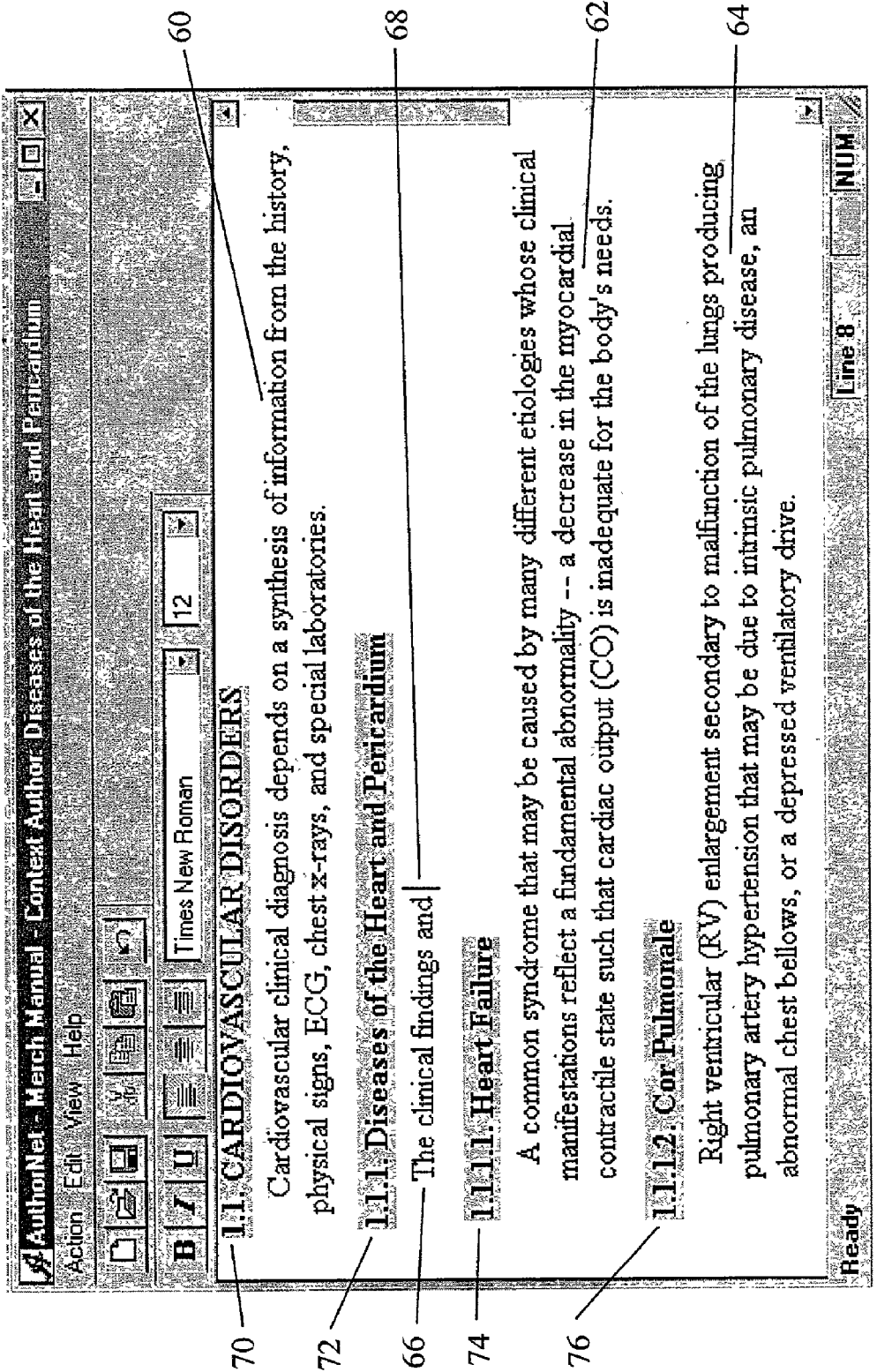
FIG. 7 is a screen view of a node's executable of invention in running state.

FIG. 7 is an example of an author's document seen at runtime. The node name is Cardiovascular (32) whose literal read-only context representation is "Diseases of the Heart and Pericardium" (72) and whose content (66) is read-writable as indicated by the cursor (68). Other content areas, (60), (62) and (64) are read-only since they are not owned by this node.

Four node contexts and contents are visible on the screen. Five styling cues are used to indicate in conventional document manner the structure of the DTD and therewith, the document. Indentation indicates ancestral position in the DTD tree. The numerical decimals (74) visual cue also shows the implied hierarchy. Bold letters, shading behind the text and read-only privileges work together to indicate which text portions are the tag literals ((70), (72), (74) and (76)), which were associated with the node tag at creation time. Different text shading and read-only privileges indicate and direct the author as to which areas are not their content areas (60), (62) and (64). (70)'s "CARDIOVASCULAR DISORDERS" therefore represents the instance tag <MerckManual>. The end tag literal has been omitted which is legal SGML since the beginning of "1.1.1 Diseases of the Heart and Pericardium" (72) indicated the termination of node element (70).

Figure 8:
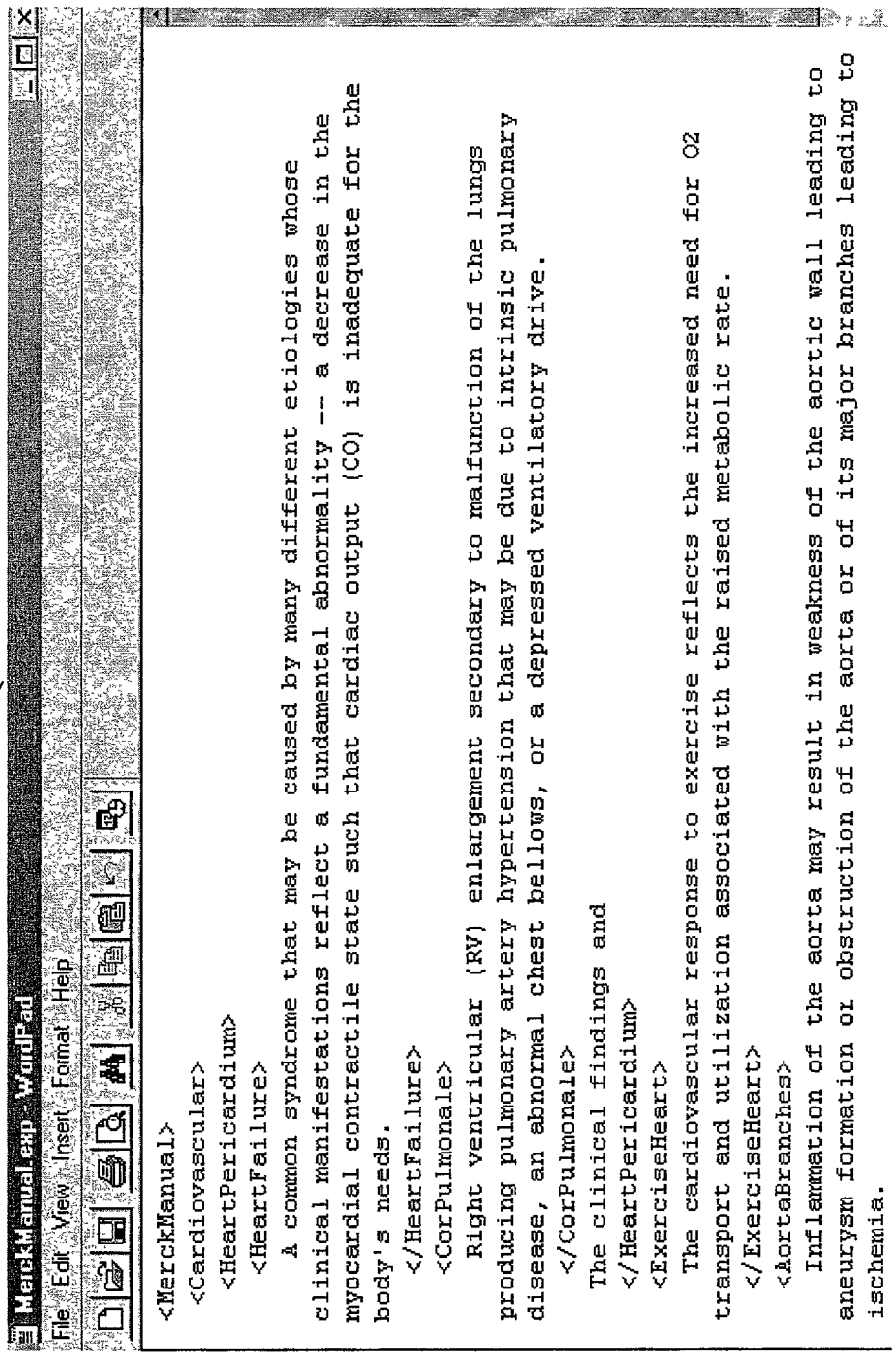
FIG. 8 is a screen view of FIG. 7 exported as a regular SGML instance without presentation.

FIG. 8 (80) shows FIG. 7 after being exported as a regular SGML instance without tag literals or other presentation artifacts.

5.7 Method for Producing Ordered Compilation of Information

The beginning step of the method is to create executable computer code that has the ability to create root context authors. In a preferred embodiment, there is one root context author per document.

The executable code of the root context generator has the ability to create root context editor types, wherein said root context generator has at least the following abilities: (1) the ability to create root node associated executable code for root context authors; and (2) the ability to distribute said executable code through a communication medium to target root context authors.

This root context author is the uppermost semantic node in the document and is of editor type. The executable computer code underlying the root context author includes computer code that has at least the following abilities: (3) the ability to maintain and update a recordation or list of each node added to the document; (4) the ability to generate an initial user interface that can receive and display the context and content changes of a document from all the other current and eventual nodes in the document; (5) the ability to propagate content changes from its own node to all other replicate view nodes in the distributed document; (6) the ability to create executable code for semantically subordinate nodes, wherein the node type is selected from a group consisting of context author and content author; (7) the ability to distribute the resulting executable code through a communication medium to the targeted author; (8) the ability to create executable code for a subscriber; (9) the ability to distribute the resulting subscriber executable code through a communication medium to the targeted subscriber; (10) the ability to create, configure and supervise descendent node user interfaces, descendent node privileges and descendent node supplementary computer code; and (11) the ability to populate the document at startup. Subordinate nodes can inherit said abilities that can be granted and revoked by super-ordinate nodes both at creation time and at execute time. The user interface enables the author to enter content edits in an assigned area of the document.

Another step is the creation of executable code for a context author. The executable computer code underlying the context author includes computer code that has at least the following abilities: (12) the ability to maintain and update a recordation or list of each node added to the document; (13) the ability to display a user interface that can receive and display the context and content changes of a document from all the other current and eventual nodes in the document; (14) the ability to propagate content changes from its own node to all other replicate view nodes in the distributed document; (15) the ability to respond to administrative requests; (16) the ability to create executable code for semantically subordinate nodes, wherein the node type is selected from a group consisting of context author and content author; (17) the ability to distribute the resulting executable code through a communication medium to the targeted author; (18) the ability to create executable code for a subscriber; (19) the ability to distribute the resulting subscriber executable code through a communication medium to the targeted subscriber; (20) the ability to create, configure and supervise descendent node user interfaces, descendent node privileges and descendent node supplementary computer code; and (21) the ability to populate the document at startup. Subordinate nodes can inherit those abilities that can be granted and revoked by super-ordinate nodes both at creation time and at execute time. The user interface enables the author to enter content edits in an assigned area of the document.

As can be seen, the root context author and the context authors share many of the same characteristics. However, while a document may have multiple context authors, in a preferred embodiment, a document only has one root context author. Furthermore, in a preferred embodiment, root context authors create their own initial user interfaces and sets of supplementary code while a context author can at most only modify inherited capabilities. Additionally, in a preferred embodiment, context authors respond to administrative commands, while root context authors reside at the top of the semantic hierarchy, and thus do not respond to such administrative commands.

In a preferred embodiment, creation of a subordinate editor type by a context author or the root context author is the first step in a method to create context change. Once a subordinate editor type has been created, editor type authors can perform all other steps of the method to create context change in any order and at any time.

Another step in the method of the invention is the creating of executable computer code for a content author. Content authors are always leaf nodes in the semantic hierarchy because they do not have the ability to create further subordinate nodes. Leaf nodes have no children nodes subordinate to them. The executable computer code underlying the content author includes computer code that has at least the following abilities: (22) the ability to maintain and update a recordation or list of each node added to the document; (23) the ability to display a user interface that can receive and display the context and content changes of a document from all the other current and eventual nodes in the document; (24) the ability to propagate content changes from its own node to all other replicate view nodes in the distributed document; (25) the ability to respond to administrative requests; (26) the ability to create executable code for a subscriber; (27) the ability to distribute through a communication medium the resulting subscriber executable code to the targeted subscriber; and (28) the ability to populate the document at startup. The user interface enables the author to enter content edits in an assigned area of the document.

Any editor type can perform the step of the method to create and propagate content change at any time and in any order.

Another step in the method of the invention is the creating of executable computer code for subscribers. Subscribers are not associated with any node and they do not have the ability to create further subordinate nodes. The executable computer code underlying the subscriber includes computer code that has at least the following abilities: (29) the ability to display a user interface that can receive and display the context and content changes of a document from all the other current and eventual nodes in the document; (30) the ability to respond to administrative requests; and (31) the ability to populate the document at startup.

Any document participant, including editor types or subscribers who have the proper privileges, can perform the step of the method to create subscribers at any time.

The step in the method for populating the document must necessarily be the first act of any site's executable code. After populating a site's document, it is referred to as being consistent. The only other time a document replica is not consistent is during change transmission times or if supplementary work flow type code deliberately delays or redirects change messages before they reach their destination. A quiescent document of this invention is a document all of whose change messages have been delivered.

5.8 System for Producing Ordered Compilation of Information

The system comprises executable computer code that has the ability to create root context authors. In a preferred embodiment, there is one root context author per document.

The executable code of the root context generator has the ability to create root context editor types, wherein said root context generator has at least the following abilities: (1) the ability to create root node associated executable code for root context authors; and (2) the ability to distribute said executable code through a communication medium to target root context authors.

This root context author is the uppermost semantic node in the document and is of editor type. The executable computer code underlying the root context author includes computer code that has at least the following abilities: (3) the ability to maintain and update a recordation or list of each node added to the document; (4) the ability to generate an initial user interface that can receive and display the context and content changes of a document from all the other current and eventual nodes in the document; (5) the ability to propagate content changes from its own node to all other replicate view nodes in the distributed document; (6) the ability to create executable code for semantically subordinate nodes, wherein the node type is selected from a group consisting of context author and content author; (7) the ability to distribute the resulting executable code through a communication medium to the targeted author; (8) the ability to create executable code for a subscriber; (9) the ability to distribute the resulting subscriber executable code through a communication medium to the targeted subscriber; (10) the ability to create, configure and supervise descendent node user interfaces, descendent node privileges and descendent node supplementary computer code; and (11) the ability to populate the document at startup. Subordinate nodes can inherit said abilities that can be granted and revoked by super-ordinate nodes both at creation time and at execute time. The user interface enables the author to enter content edits in an assigned area of the document.

In a preferred embodiment the system further comprises executable code for a context author. The executable computer code underlying the context author includes computer code that has at least the following abilities: (12) the ability to maintain and update a recordation or list of each node added to the document; (13) the ability to display a user interface that can receive and display the context and content changes of a document from all the other current and eventual nodes in the document; (14) the ability to propagate content changes from its own node to all other replicate view nodes in the distributed document; (15) the ability to respond to administrative requests; (16) the ability to create executable code for semantically subordinate nodes, wherein the node type is selected from a group consisting of context author and content author; (17) the ability to distribute the resulting executable code through a communication medium to the targeted author; (18) the ability to create executable code for a subscriber; (19) the ability to distribute the resulting subscriber executable code through a communication medium to the targeted subscriber; (20) the ability to create, configure and supervise descendent node user interfaces, descendent node privileges and descendent node supplementary computer code; and (21) the ability to populate the document at startup. Subordinate nodes can inherit those abilities that can be granted and revoked by superordinate nodes both at creation time and at execute time. The user interface enables the author to enter content edits in an assigned area of the document.

As can be seen, the root context author and the context authors share many of the same characteristics. However, while a document may have multiple context authors, in a preferred embodiment, a document only has one root context author. Furthermore, in a preferred embodiment, root context authors create their own initial user interfaces and sets of supplementary code while a context author can at most only modify inherited capabilities. Additionally, in a preferred embodiment, context authors respond to administrative commands, while root context authors reside at the top of the semantic hierarchy, and thus do not respond to such administrative commands.

In a preferred embodiment, the system creates context change by first creating subordinate editor type by a context author or the root context author. Once a subordinate editor type has been created, editor type authors create context change in any order and at any time.

In a preferred embodiment the system is capable of creating executable computer code for a content author. Content authors are always leaf nodes in the semantic hierarchy because they do not have the ability to create further subordinate nodes. Leaf nodes have no children nodes subordinate to them. The executable computer code underlying the content author includes computer code that has at least the following abilities: (22) the ability to maintain and update a recordation or list of each node added to the document; (23) the ability to display a user interface that can receive and display the context and content changes of a document from all the other current and eventual nodes in the document; (24) the ability to propagate content changes from its own node to all other replicate view nodes in the distributed document; (25) the ability to respond to administrative requests; (26) the ability to create executable code for a subscriber; (27) the ability to distribute through a communication medium the resulting subscriber executable code to the targeted subscriber; and (28) the ability to populate the document at startup. The user interface enables the author to enter content edits in an assigned area of the document.

Any editor type can create and propagate content change at any time and in any order.

In a preferred embodiment the system is capable of creating executable computer code for subscribers. Subscribers are not associated with any node and they do not have the ability to create further subordinate nodes. The executable computer code underlying the subscriber includes computer code that has at least the following abilities: (29) the ability to display a user interface that can receive and display the context and content changes of a document from all the other current and eventual nodes in the document; (30) the ability to respond to administrative requests; and (31) the ability to populate the document at startup.

Any document participant, including editor types or subscribers who have the proper privileges, can create subscribers at any time.

In a preferred embodiment of the system, populating the document must necessarily be the first act of any site's executable code. After populating a site's document, it is referred to as being consistent. The only other time a document replica is not consistent is during change transmission times or if supplementary work flow type code deliberately delays or redirects change messages before they reach their destination. A quiescent document of this invention is a document all of whose change messages have been delivered.

As is understood by a person skilled in the art, the purpose of the foregoing illustration is for clarifying the present invention rather than limiting of the present invention. It is intended to demonstrate various concepts included within the spirit and scope of the appended claims, the scope of which should be accorded the broadest interpretation so as to encompass all such renditions of similar structure.

What is claimed is:

1. A system for producing a distributed document having an ordered compilation of information, the system comprising multiple fragment editor executables that function cooperatively as one implemented, yet evolving document type declaration (DTD) wherein said evolving DTD is distributed among multiple sites of a computer network and operate in a peer-to-peer environment without a central server, the system allowing multiple authors navigating by graphical user interface cues and DTD context to edit the distributed document and DTD contemporaneously, wherein the evolving DTD is implemented by pushing the edit and DTD context changes among the fragment executables such that each of the multiple authors and subscribers are allowed to view edits and DTD changes made by others of the multiple authors contemporaneously.

2. The system of claim 1, wherein replicates of the complete document reside at the multiple sites of the computer network.

3. The system of claim 2, wherein an edit made by any one of the multiple authors is propagated among the replicates residing at the multiple sites of the computer network.

4. The system of claim 3, wherein an edit made by any one of the multiple authors is immediately propagated among the replicates residing at the multiple sites of the computer network.

5. The system of claim 2, wherein an edit made by any one of the multiple authors is propagated as an atomic transaction among the replicates residing at the multiple sites of the computer network.

6. The system of claim 2, wherein the replicates reside in computer memory at the multiple sites of the computer network.

7. The system of claim 6, wherein the replicates are persisted by writing to computer hard disks at the multiple sites of the computer network.

8. The system of claim 1, wherein each author of the multiple authors is assigned an entity type having associated therewith corresponding executables that define the role an author can play in creating distributed document.

9. The system of claim 8, wherein the roles that an author plays in creating the distributed document is selected from the group consisting of: root context author, context author, and content author.

10. The system of claim 1, wherein a subscriber can view edits made by one or more of the multiple authors.

11. The system of claim 1, wherein the ordered compilation is an SGML document.

12. The system of claim 11, wherein the ordered compilation is an SGML document selected from the group consisting of XML and HTML.

13. The system of claim 1, the system comprising: (a) executable computer code for a root context author generator comprising: (i) computer code for creating root node associated executable code for at least one root context author wherein said root context author is editor type; (ii) computer code for distribution through a communication medium to said root context author said executable code; (b) executable computer code for said root context author comprising: (iii) computer code for maintaining and updating a recordation of each node added to a document; (iv) computer code for creating an initial user interface wherein said user interface receives and displays the content of said document from other nodes and said interface enables said root context author to enter content edits in an assigned area of said document; (v) computer code for propagating content changes from said root context author to all other replicate view nodes at author and subscriber sites; (vi) computer code for creating root node associated executable code for at least one target node wherein the type of said target node is selected from the group consisting of a context author and a content author wherein said context author administrates and is editor type and said content author is editor type; (vii) computer code for distributing through a communication medium to said target node said root node associated executable code; (viii) computer code for creating subscriber executable code for at least one target subscriber wherein said target subscriber is not editor type; (ix) computer code for distributing through a communication medium to said target subscriber said subscriber executable code; (x) computer code for said administration wherein said administration comprises the ongoing granting and revoking of descendent node privileges, the ongoing configuration of descendent node user interfaces, and the ongoing configuration of descendent node supplementary computer code; (xi) code for populating said document at startup; (c) executable code for said context author wherein said context author comprises: (xii) computer code for maintaining and updating a recordation of each node added to a document; (xiii) computer code for a user interface wherein said user interface receives and displays the content of said document and said interface enables said context author to enter content edits in the assigned area of said document (xiv) computer code for propagating content changes from its own node to all other replicate view nodes at author and subscriber sites; (xv) computer code for responding to an administrative request; (xvi) computer code for creating node associated executable code for at least one target node wherein said target node is selected from the group consisting of a context author and a content author wherein said context author administrates and is editor type and said content author is editor type; (xvii) computer code for distributing through a communication medium to said target node said associated executable code; (xviii) computer code for creating subscriber executable code for at least one target subscriber wherein said target subscriber is not editor type; (xix) computer code for distributing through a communication medium to said target subscriber said subscriber executable code; (xx) computer code for said administration wherein said administration comprises the ongoing granting and revoking of descendent node privileges, the ongoing configuration of descendent node user interfaces, and the ongoing configuration of descendent node supplementary computer code; (xxi) computer code for populating said document at startup; (d) executable code for said content author wherein said content author comprises: (xxii) computer code for maintaining and updating a recordation of each node added to a document; (xxiii) computer code for a user interface wherein said user interface receives and displays the content of said document and said interface enables said content author to enter content edits in the assigned area of said document; (xxiv) computer code for propagating content changes from its own node to all other replicate view nodes at author and subscriber sites; (xxv) computer code for responding to an administrative request; (xxvi) code for creating subscriber executable code for at least one target subscriber wherein said target subscriber is not editor type; (xxvii) computer code for distributing through a communication medium to said target subscriber said subscriber executable code; (xxviii) computer code for populating said document at startup; (e) executable code for said subscriber wherein said subscriber comprises: (xxix) computer code for a user interface wherein said user interface receives and displays the content of said document; (xxx) computer code for responding to an administrative request; (xxxi) computer code for populating said document at startup.

14. The system of claim 13, wherein the ordered compilation is an SGML document.

15. The system of claim 13, wherein the ordered compilation is an SGML document selected from the group consisting of XML and HTML.

16. The system of claim 13, wherein the nodes produced by said root context author and said context author are semantically valid elements within a document type declaration.

17. A method for producing the system of claim 1, the method comprising: (a) erecting executable computer code for a root context author generator comprising: (i) computer code for creating root node associated executable code for at least one root context author wherein said root context author is editor type; (ii) computer code for distribution through a communication medium to said root context author said executable code; (b) creating executable computer code for said root context author comprising: (iii) computer code for maintaining and updating a recordation of each node added to a document; (iv) computer code for creating an initial user interface wherein said user interface receives and displays the content of said document from other nodes and said interface enables said root context author to enter content edits in an assigned area of said document; (v) computer code for propagating content changes from said root context author to all other replicate view nodes at author and subscriber sites; (vi) computer code for creating root node associated executable code for at least one target node wherein the type of said target node is selected from the group consisting of a context author and a content author wherein said context author administrates and is editor type and said content author is editor type; (vii) computer code for distributing through a communication medium to said target node said root node associated executable code; (viii) computer code for creating subscriber executable code for at least one target subscriber wherein said target subscriber is not editor type; (ix) computer code for distributing through a communication medium to said target subscriber said subscriber executable code; (x) computer code for said administration wherein said administration comprises the ongoing granting and revoking of descendent node privileges, the ongoing configuration of descendent node user interfaces, and the ongoing configuration of descendent node supplementary computer code; (xi) code for populating said document at startup; (c) creating executable code for said context author wherein said context author comprises: (xii) computer code for maintaining and updating a recordation of each node added to a document; (xiii) computer code for a user interface wherein said user interface receives and displays the content of said document and said interface enables said context author to enter content edits in the assigned area of said document; (xiv) computer code for propagating content changes from said context author to all other replicate view nodes at author and subscriber sites; (xv) computer code for responding to an administrative request; (xvi) computer code for creating node associated executable code for at least one target node wherein said target node is selected from the group consisting of a context author and a content author wherein said context author administrates and is editor type and said content author is editor type; (xvii) computer code for distributing through a communication medium to said target node said associated executable code; (xviii) computer code for creating subscriber executable code for at least one target subscriber wherein said target subscriber is not editor type; (xix) computer code for distributing through a communication medium to said target subscriber said subscriber executable code; (xx) computer code for said administration wherein said administration comprises the ongoing granting and revoking of descendent node privileges, the ongoing configuration of descendent node user interfaces, and the ongoing configuration of descendent node supplementary computer code; (xxi) computer code for populating said document at startup; (d) creating executable code for said content author wherein said content author comprises: (xxii) computer code for maintaining and updating a recordation of each node added to a document; (xxiii) computer code for a user interface wherein said user interface receives and displays the content of said document and said interface enables said content author to enter content edits in the assigned area of said document; (xxiv) computer code for propagating content changes from said content author to all other replicate view nodes at author and subscriber sites; (xxv) computer code for responding to an administrative request; (xxvi) computer code for creating subscriber executable code for at least one target subscriber wherein said target subscriber is not editor type; (xxvii) computer code for distributing through a communication medium to said target subscriber said subscriber executable code; (xxviii) computer code for populating said document at startup; (e) creating executable code far said subscriber wherein said subscriber comprises: (xxix) computer code for a user interface wherein said user interface receives and displays the content of said document; (xxx) computer code for responding to an administrative request; (xxxi) computer code for populating said document at startup.

18. A method as in claim 17, wherein the ordered compilation is an SGML document.

19. A method as in claim 18, wherein the ordered compilation is an SGML document selected front the group consisting of XML and HTML.

20. A method as in claim 17, wherein the nodes produced by said root context author and said context author are semantically valid elements within a document type declaration.

* * * * *